(12) United States Patent
Nakayama et al.

(10) Patent No.: US 10,913,394 B2
(45) Date of Patent: Feb. 9, 2021

(54) VEHICULAR REARVIEW MIRROR DEVICE

(71) Applicant: Panasonic Intellectual Property Management Co., Ltd., Osaka (JP)

(72) Inventors: Tsukasa Nakayama, Kanagawa (JP); Norihito Kitajima, Kanagawa (JP); Tomoaki Yamamoto, Kanagawa (JP); Yuji Matsumoto, Kanagawa (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 182 days.

(21) Appl. No.: 16/326,727

(22) PCT Filed: Sep. 21, 2017

(86) PCT No.: PCT/JP2017/034043
§ 371 (c)(1),
(2) Date: Feb. 20, 2019

(87) PCT Pub. No.: WO2018/061963
PCT Pub. Date: Apr. 5, 2018

(65) Prior Publication Data
US 2019/0202359 A1    Jul. 4, 2019

(30) Foreign Application Priority Data

Sep. 30, 2016 (JP) .................................. 2016-194576
Sep. 30, 2016 (JP) .................................. 2016-194579

(51) Int. Cl.
*B60R 1/04* (2006.01)
*B60R 1/12* (2006.01)
(Continued)

(52) U.S. Cl.
CPC .................. *B60R 1/04* (2013.01); *B60R 1/086* (2013.01); *B60R 1/12* (2013.01); *G02B 7/182* (2013.01);
(Continued)

(58) Field of Classification Search
CPC ........... B60R 1/04; B60R 1/086; B60R 1/087; B60R 1/12; B60R 1/02; B60R 1/00;
(Continued)

(56) References Cited

U.S. PATENT DOCUMENTS 4,202,603 A * 5/1980 Miyauchi ................ B60R 1/072
359/873
4,787,726 A * 11/1988 Hendricks ............. B60R 1/0612
248/900
(Continued)

FOREIGN PATENT DOCUMENTS

DE    102011011334 A1    12/2011
EP        1593550 A1    11/2005
JP        4754294 B     8/2011

OTHER PUBLICATIONS

International Search Report of PCT application No. PCT/JP2017/034043 dated Nov. 28, 2017.
(Continued)

*Primary Examiner* — Marin Pichler
(74) *Attorney, Agent, or Firm* — Greenblum & Bernstein, P.L.C.

(57) ABSTRACT

A vehicular rearview mirror device includes a housing, a mirror, a camshaft, a fixed part, and a drive part. As the camshaft is rotated by a driving force transmitted from the drive part, and moves toward the fixed part by the action of a cam, a movable part including the housing, the mirror, and the drive part as a whole tilts. The drive part includes a drive source, and a gear train transmitting the driving force of the
(Continued)

drive source to the camshaft. The gear train includes a first gear disposed to the camshaft, and a second gear that elastically meshes with the first gear.

9 Claims, 10 Drawing Sheets

(51) Int. Cl.
  *G02B 7/182* (2006.01)
  *B60R 1/08* (2006.01)
  *B60R 1/00* (2006.01)
(52) U.S. Cl.
  CPC ......... *B60R 1/00* (2013.01); *B60R 2001/1215* (2013.01)
(58) Field of Classification Search
  CPC .... B60R 2001/1215; B60R 2001/1253; G02B 7/182; G02B 7/1827
  USPC ........ 359/839, 843, 844, 871, 872–873, 877
  See application file for complete search history.

(56) References Cited

U.S. PATENT DOCUMENTS

2005/0248847 A1 11/2005 Weimer et al.
2016/0250973 A1 9/2016 Kuester et al.

OTHER PUBLICATIONS

English Translation of German Examination Report dated Aug. 27, 2019 for the related German Patent Application No. 112017004176.7.

* cited by examiner

Turn

Movement

VEHICULAR REARVIEW MIRROR DEVICE

CROSS-REFERENCE TO RELATED APPLICATIONS

This application is a U.S. national stage application of the PCT International Application No. PCT/JP2017/034043 filed on Sep. 21, 2017, which claims the benefit of foreign priority of Japanese patent applications No. 2016-194576 and No. 2016-194579 both filed on Sep. 30, 2016, the contents all of which are incorporated herein by reference.

TECHNICAL FIELD

The present disclosure relates to a vehicular rearview mirror device attached to a vehicle interior and including a display surface whose inclination angle can be electrically adjusted.

BACKGROUND ART

A vehicle is obligated to have a rear mirror in order to secure rearward visibility. Conventionally, as the rear mirror (hereinafter, referred to as a "rearview mirror") attached to a vehicle interior, an antiglare rearview mirror has been known. The antiglare rearview mirror has a display surface (for example, a mirror surface) whose inclination angle can be changed. The antiglare rearview mirror can prevent a driving action of a driver from being hindered when a headlight of a following vehicle reflects.

Furthermore, a rearview mirror assembly has been practically used. The rearview mirror assembly includes a display device (for example, a liquid crystal display) displaying a rear field of vision captured by a camera, and can provide a driver with a clear rear field of vision in various travelling environments. The rearview mirror assembly of this type includes a one-way mirror that reflects a part of incident light and transmits a part of the incident light, and a liquid crystal display disposed on a back surface side of the one-way mirror. In order to ensure the visibility of the one-way mirror and the display device, the rearview mirror assembly is configured to change an inclination angle of the display surface depending on the on/off state of the display device.

For example, PTL 1 discloses a technology for automatically adjusting an inclination angle of a display surface by receiving commands for angle adjustment based on voice of a driver. In the technology, a mirror to which a face or a sight line of a driver faces is subjected to angle adjustment.

CITATION LIST

Patent Literature

PTL 1: Japanese Patent Publication No. 4754294

SUMMARY OF THE INVENTION

In recent years, with advances in hybrid and electric vehicles, travelling sound has almost disappeared, and silence of a vehicle interior is extremely high. Therefore, a rearview mirror installed inside the vehicle interior is required to have quietness. When an inclination angle of a display surface is automatically changed, applying a drive unit including a motor and a gear train is advantageous in terms of quietness.

In this case, for example, a housing is attached to a fixed part rotationally movably. The fixed part is connected to a support part attached to a vehicle interior. Furthermore, a camshaft is rotatably attached to a bearing of the housing. A cam of the camshaft abuts on the fixed part. A driving force of a motor is transmitted to the camshaft via the gear train, and the camshaft and the cam are rotated. Thereby, the camshaft moves with respect to the fixed part. In conjunction with the movement of the camshaft, a movable part including the housing that axially supports the camshaft, as a whole, rotationally moves with respect to the fixed part. Thus, the inclination angle of the display surface is changed.

Incidentally, when a gear train is assembled, proper backlash is provided so that two meshing gears freely rotate. In a pair of a last-stage gear in the gear train (a gear disposed to the camshaft) and a gear that meshes with the last-stage gear, when the inclination angle of the display surface is changed, a load is applied along with the movement of the camshaft, and the backlash becomes in a biased state. When the motor stops driving and the load is released, meshing of the gears returns to a normal state. Therefore, an impact noise occurs at the time.

An object of the present disclosure is to provide a vehicular rearview mirror device including a display surface whose inclination angle can be electrically adjusted, in which occurrence of an impact noise caused by backlash provided in a gear train can be prevented when the inclination angle is changed, and quietness is excellent.

A vehicular rearview mirror device according to the present disclosure includes a housing, a mirror, a camshaft, a fixed part, and a drive part. The mirror covers an opening portion of the housing. The camshaft has a cam and is axially supported by the housing. The fixed part abuts on the cam and is axially supported by the housing. The drive part provides the camshaft with a driving force for rotating the camshaft. In the vehicular rearview mirror device, the camshaft is rotated with the driving force transmitted from the drive part, a camshaft is moved to the fixed part by the action of the cam. Along with this movement, the movable part including the housing, the mirror, and the drive part as a whole tilts. The drive part includes a drive source and a gear train for transmitting the driving force of the drive source to the camshaft. The gear train includes a first gear provided to the camshaft, and a second gear that elastically meshes with the first gear.

According to the present disclosure, since backlash provided to the gear train can be minimized, occurrence of an impact noise caused by the backlash when the inclination angle is changed can be prevented. Thus, the present disclosure can provide a vehicular rearview mirror device excellent in quietness.

DESCRIPTION OF EMBODIMENTS

Hereinafter, an exemplary embodiment of the present disclosure is described in detail with reference to drawings.

Figure 1:
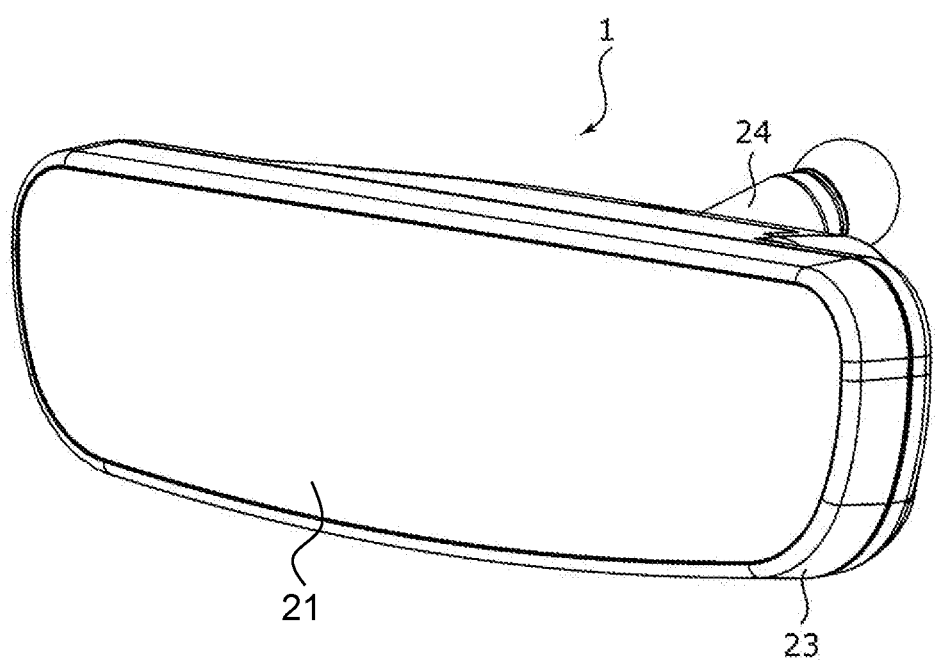
FIG. 1 is a perspective view showing an example of an appearance of a rearview mirror assembly in accordance with an exemplary embodiment.
Figure 2:
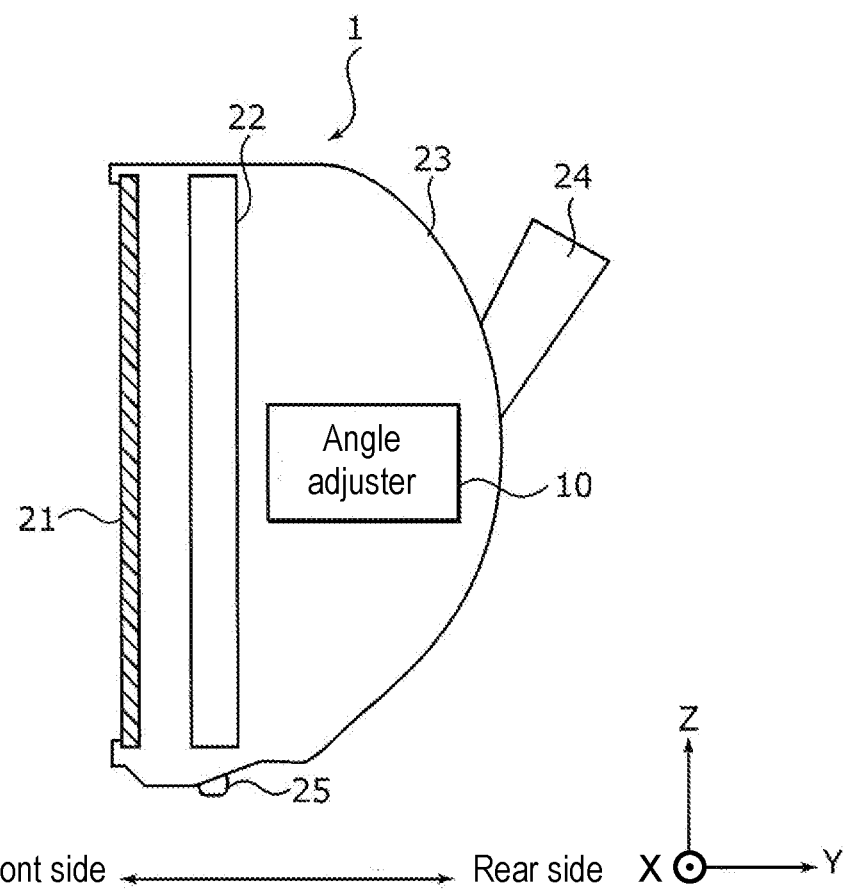
FIG. 2 is a schematic view showing an example of an inside configuration of the rearview mirror assembly.

FIG. 1 is a perspective view showing an example of an appearance of rearview mirror assembly 1 in accordance with the exemplary embodiment of the present disclosure. FIG. 2 is a view showing an example of an inside configuration of rearview mirror assembly 1. Rearview mirror assembly 1 is hung on a ceiling of a vehicle interior, for example, in the vicinity of a windshield of the vehicle, and is used for rearward visual recognition.

This exemplary embodiment is described using the orthogonal coordinate system (X, Y, Z). The drawings described later are also shown using the common orthogonal coordinate system (X, Y, Z). Rearview mirror assembly 1 is installed in the vehicle such that the X direction is a left-right direction, the Y direction is a front-rear direction, and the Z direction is an up-down direction.

As shown in FIGS. 1 and 2, rearview mirror assembly 1 includes angle adjuster 10, one-way mirror 21, liquid crystal display 22, housing 23, support part 24, changeover switch 25, and the like. Rearview mirror assembly 1 has a first use state (mirror mode) in which the rearward visual recognition is performed by using a reflected image reflected on a mirror surface of one-way mirror 21, and a second use state (display mode) in which the rearward visual recognition is performed by using a displayed image of liquid crystal display 22.

Housing 23 accommodates one-way mirror 21, liquid crystal display 22, angle adjuster 10, and the like. One-way mirror 21 is disposed in the front side (at an opening portion of housing 23), and liquid crystal display 22 is disposed in the back side of one-way mirror 21 (inside housing 23).

Note here that the front side is located in the negative Y-axis direction shown in FIG. 1, and the back side is located in the positive Y-axis direction. That is to say, one-way mirror 21 is disposed to the front surface of housing 23, and liquid crystal display 22 faces a back surface of one-way mirror 21. In addition, angle adjuster 10 is disposed at a back side of liquid crystal display 22. One-way mirror 21 and liquid crystal display 22 tilt together with housing 23 depending on a use state. Note here that the front surface is an outer surface that is in parallel to the X-Z plane and present around the opening portion. The back surface is in parallel to the X-Z plane and is present farther in the positive Y-axis direction than the front surface, and is on the reverse side from the front surface.

One-way mirror 21 is an optical member that reflects incident light from the front side (in the negative Y-axis direction), and transmits the incident light from the back side (in the positive Y-axis direction). For example, a half mirror in which its reflectance is equal to its transmittance can be used as one-way mirror 21.

Liquid crystal display 22 includes a liquid crystal panel and a backlight (both are not shown). Liquid crystal display 22 displays an image of the rear field of vision of the vehicle, captured by a rear camera (not shown). The liquid crystal panel has an outer shape similar to one-way mirror 21 or an outer shape corresponding to the display area. The rear camera is disposed rearward of a rear sheet and captures an image of the rear field of vision of the vehicle through a rear-window glass. The rear camera may be attached to a vehicle exterior. For example, the rear camera may be incorporated in a rear emblem (not shown) or a rear end of a roof (not shown) of the vehicle. The rear camera is connected to rearview mirror assembly 1 (liquid crystal display 22) capable of wired or wireless communication.

Support part 24 is attached to an upper end of the windshield or a front end of the ceiling, and turnably supports rearview mirror assembly 1. Support part 24 is connected to the below-mentioned fixed part 13 through ball joint 24a. By turning housing 23 around the ball joint of support part 24, an attaching angle is adjusted such that a driver can visually recognize a reflected image of the rear field of vision reflected on one-way mirror 21, depending on the eye position (eye point) of the driver, specifically, in the first use state.

Changeover switch 25 is a switch for switching the use state of rearview mirror assembly 1. When changeover switch 25 is operated, motor 111 (see FIGS. 4A and 4B) rotates normally or reversely based on a current use state, and the use state is switched to the other use state. The current use state is detected by, for example, a state-detection switch (not shown) provided to camshaft 12 (see FIGS. 3A and 3B). The state-detection switch is turned on, for example, in the first use state, and turned off in the second use state.

Note that liquid crystal display 22 may be ON/OFF controlled in conjunction with the operation of changeover switch 25, or may be ON/OFF controlled based on the detection results of the state-detection switch.

In the first use state, liquid crystal display 22 is in an OFF state, and the driver visually recognizes a reflected image reflected on one-way mirror 21. On the other hand, in the second use state, liquid crystal display 22 is in an ON state, and the driver visually recognizes a display image of liquid crystal display 22 through one-way mirror 21.

Angle adjuster 10 changes an inclination angle of the display surface depending on the use state. In the second use state, housing 23 as a whole is inclined upward more than the first use state. Thus, reflection of a reflected image on one-way mirror 21 is reduced, and visibility of liquid crystal display 22 is secured.

Figure 3A:
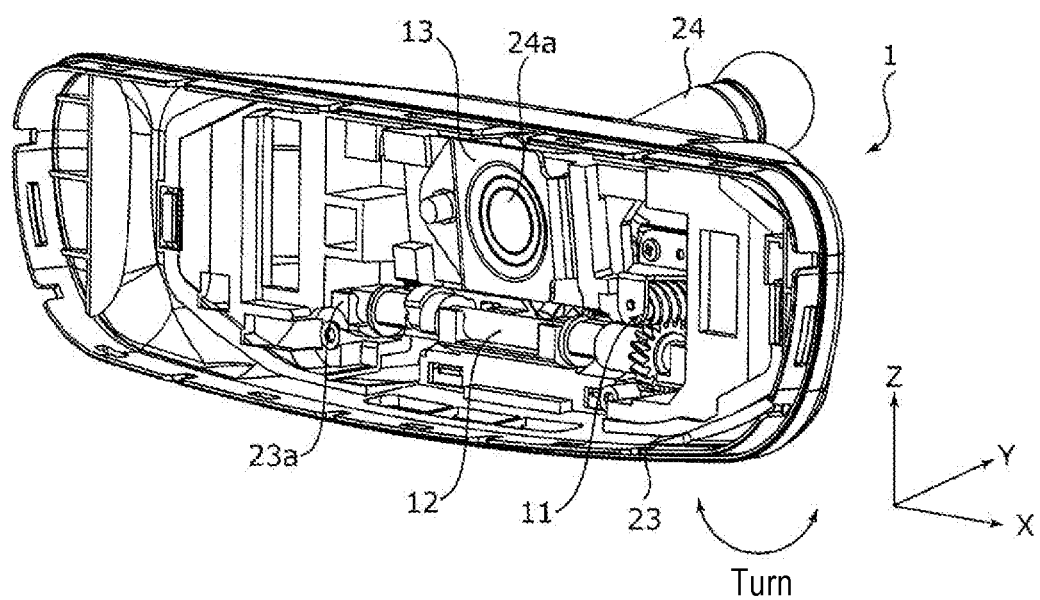
FIG. 3A is a perspective view showing an angle adjuster in a state in which a one-way mirror and a liquid crystal display are removed and a front surface is opened in a housing of the rearview mirror assembly shown in FIG. 1.
Figure 3B:
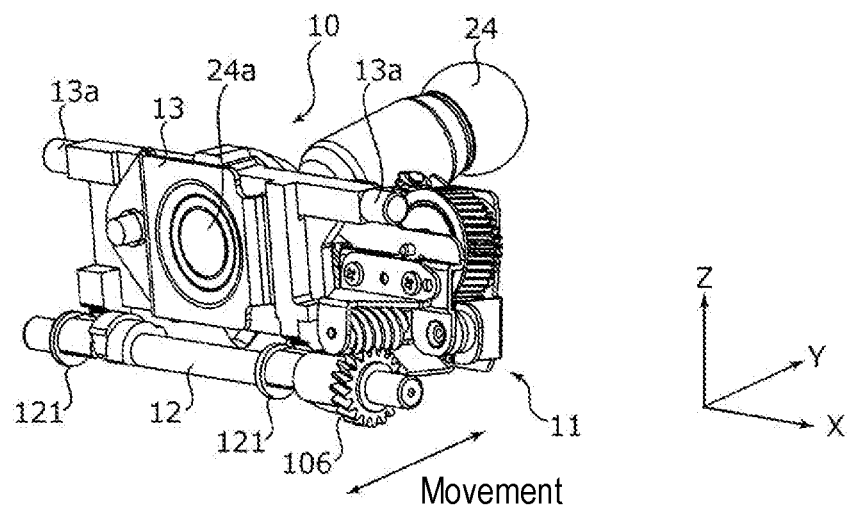
FIG. 3B is a perspective view showing a state in which the angle adjuster shown in FIG. 3A is taken out from the housing.

FIGS. 3A and 3B are views showing an example of angle adjuster 10. FIG. 3A shows a state in which the front surface is opened by removing one-way mirror 21, liquid crystal display 22, and the like, from housing 23, and FIG. 3B shows a state in which angle adjuster 10 is taken out from housing 23.

As shown in FIGS. 3A and 3B, angle adjuster 10 includes drive part 11, camshaft 12, and fixed part 13.

As shown in the below-described FIGS. 5A and 5B, drive part 11 is a motor unit (hereinafter, referred to as "motor unit 11") including motor 111 and gear train including gears 101 to 106 (see FIGS. 5A and 5B). Motor unit 11 transmits a driving force of motor 111 to camshaft 12 so as to rotate camshaft 12. Detailed configuration of motor unit 11 is described later.

Figure 8A:
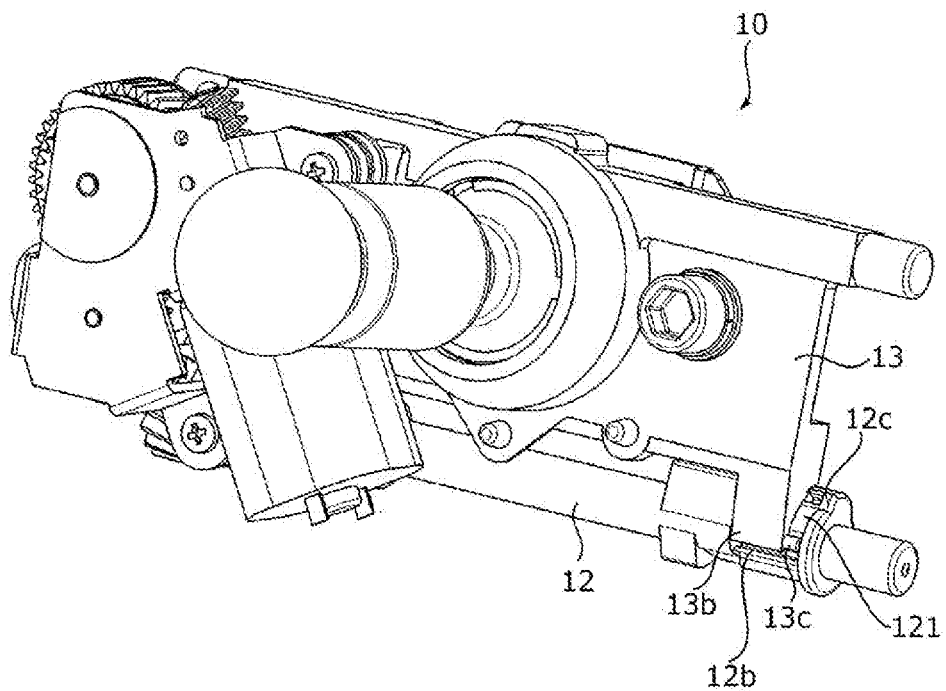
FIG. 8A is a view showing the back side of the angle adjuster shown in FIG. 3B.
Figure 8B:
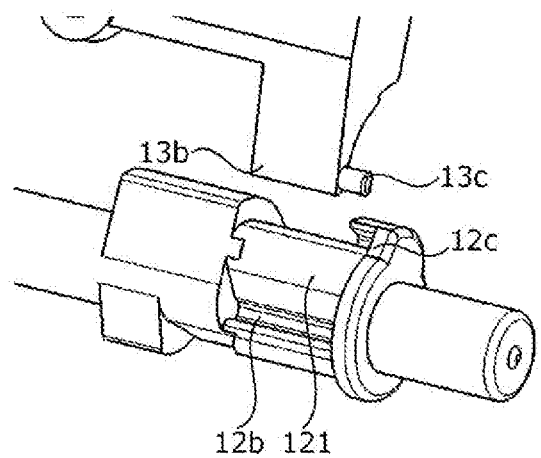
FIG. 8B is an enlarged view showing a cam and a periphery of the cam in FIG. 8A.

As shown in FIG. 3A, camshaft 12 is axially supported by bearing 23a of housing 23. As shown in FIG. 3B, camshaft 12 has cams 121 abutting on fixed part 13 in two sections in the axial direction, respectively. In the vicinity of one end of camshaft 12, last-stage gear 106 (a worm wheel) of the gear train is disposed. Furthermore, as shown in FIGS. 8A and 8B, camshaft 12 includes first engaging part 12b to be engaged with engaging piece 13b of fixed part 13 in the first use state, and second engaging part 12c to be engaged with engaging piece 13c of fixed part 13 in the second use state (see FIGS. 8A and 8B). FIG. 8A is a view showing the back side of angle adjuster 10, and FIG. 8B is an enlarged view showing cam 121 and the periphery of cam 121.

As shown in FIG. 3B, fixed part 13 is coupled to support part 24 via ball joint 24a. Fixed part 13 has fixed shafts 13a at both sides of the upper part. Each of fixed shafts 13a is axially supported by a bearing (not shown) of housing 23. Furthermore, fixed part 13 has engaging pieces 13b and 13c that regulate the rotational movement of camshaft 12 (see FIGS. 8A and 8B, 10A, and 10B). First engaging part 12b, second engaging part 12c of camshaft 12, and engaging pieces 13b and 13c of fixed part 13 constitute a stopper for regulating the movable range at the time of the angle adjustment.

Figure 9A:
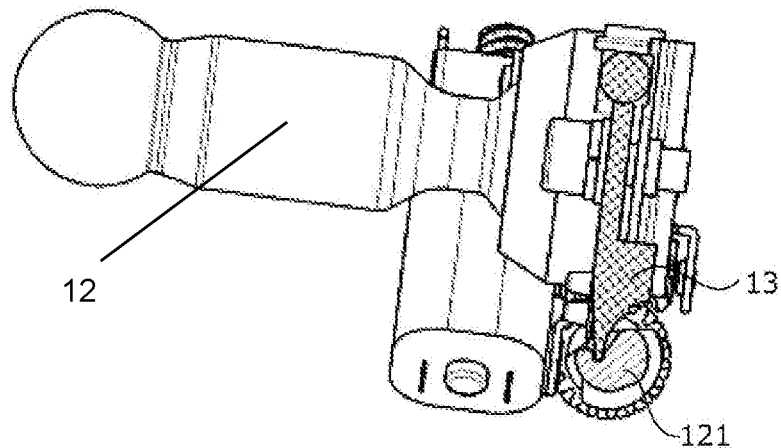
FIG. 9A is a view showing a state of a camshaft before rotation of the camshaft.
Figure 9B:
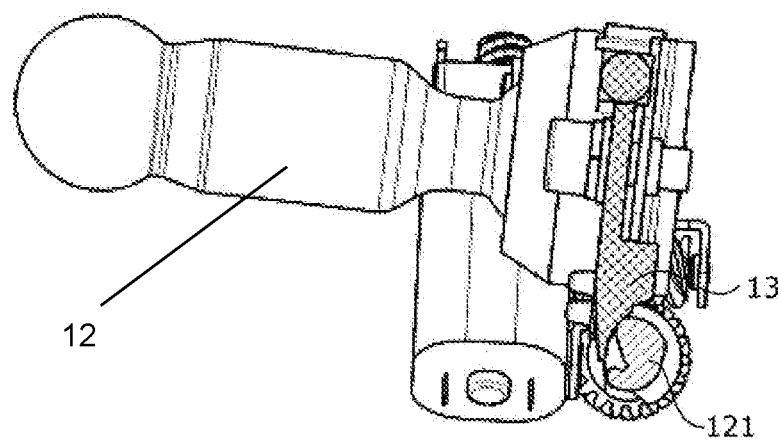
FIG. 9B is a view showing a state in which the camshaft is moved frontward from the state of FIG. 9A.
Figure 9C:
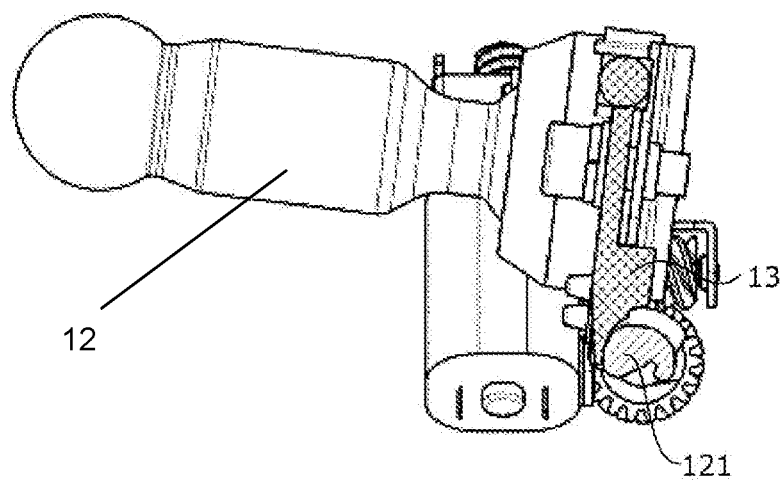
FIG. 9C is a view showing a state in which the camshaft is moved further frontward from the state of FIG. 9B.
Figure 10A:
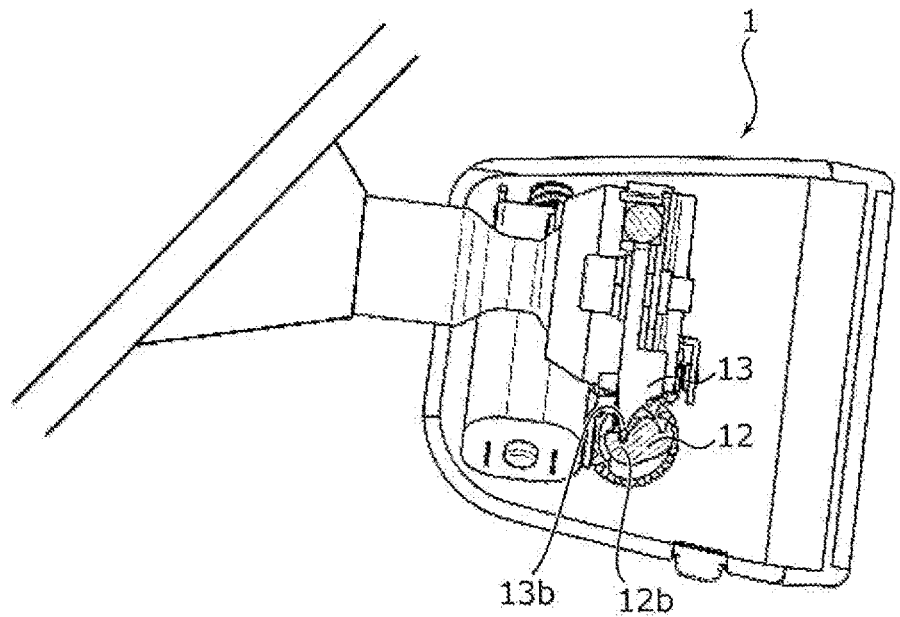
FIG. 10A is a view showing a state of a movable part before the camshaft is rotated.
Figure 10B:
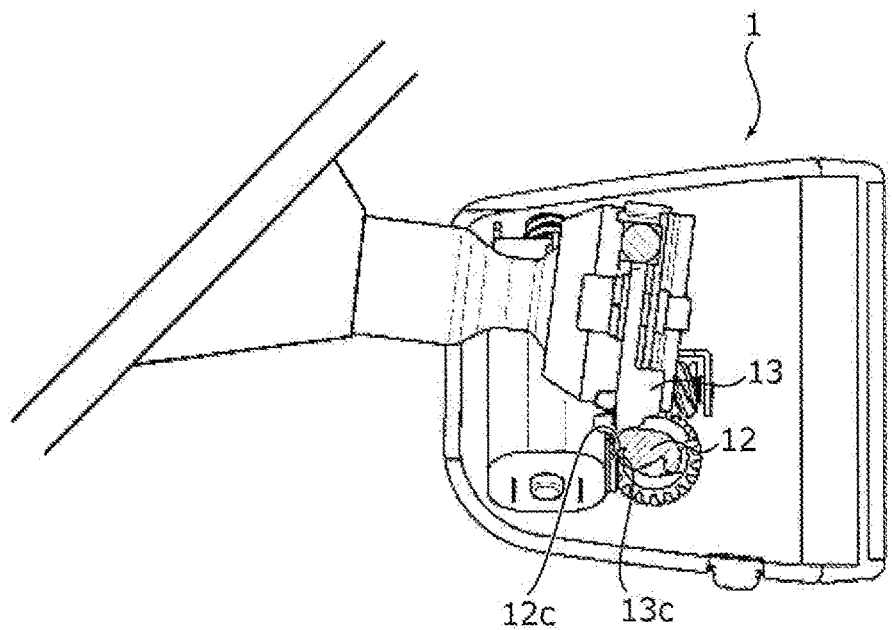
FIG. 10B is a view showing a state in which the movable part is tilted upward from the state of FIG. 10A.

When camshaft 12 is rotated by a driving force of motor 111, by the action of cam 121, camshaft 12 moves frontward (in the negative Y-axis direction) or rearward (in the positive Y-axis direction) with respect to fixed part 13 (see FIGS. 9A to 9C). Since housing 23 axially supports fixed shaft 13a of fixed part 13, housing 23 turns around fixed shaft 13a in response to the movement of camshaft 12. Thus, the inclination angle of the movable part including housing 23, one-way mirror 21, liquid crystal display 22, and drive part 11, that is, the inclination angle of the display surface is changed (see FIGS. 10A and 10B). FIGS. 9A to 10B show a state in which camshaft 12 moves frontward, and a state in which the movable part tilts upward when the first use state is shifted to the second use state, respectively.

Figure 4A:
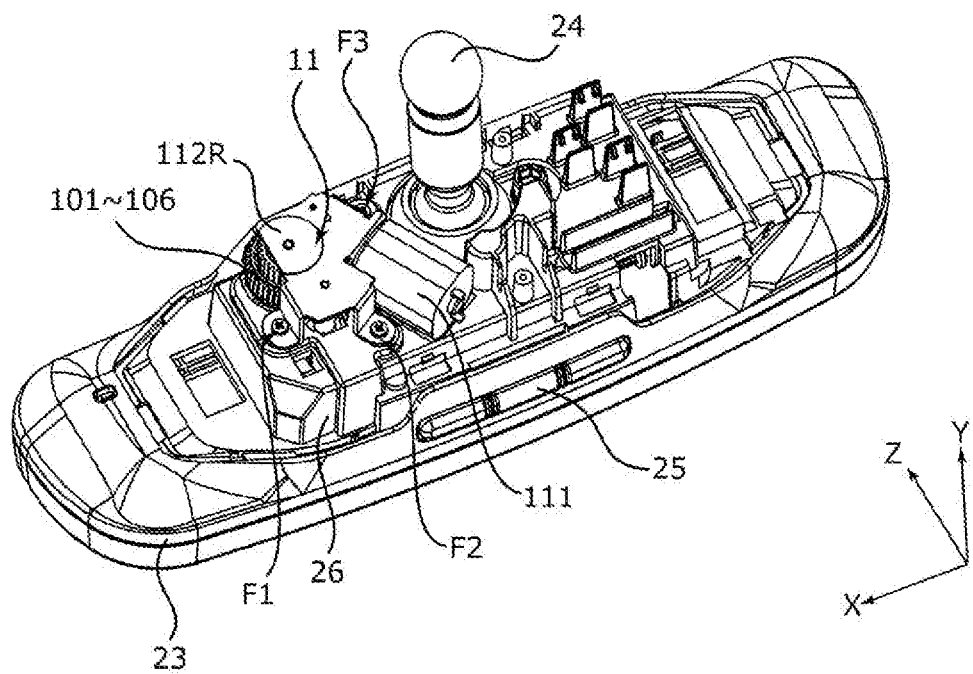
FIG. 4A is a rear perspective view showing an attachment mode of a motor unit in a state in which a back surface portion of the housing is removed in the rearview mirror assembly shown in FIG. 1.
Figure 4B:
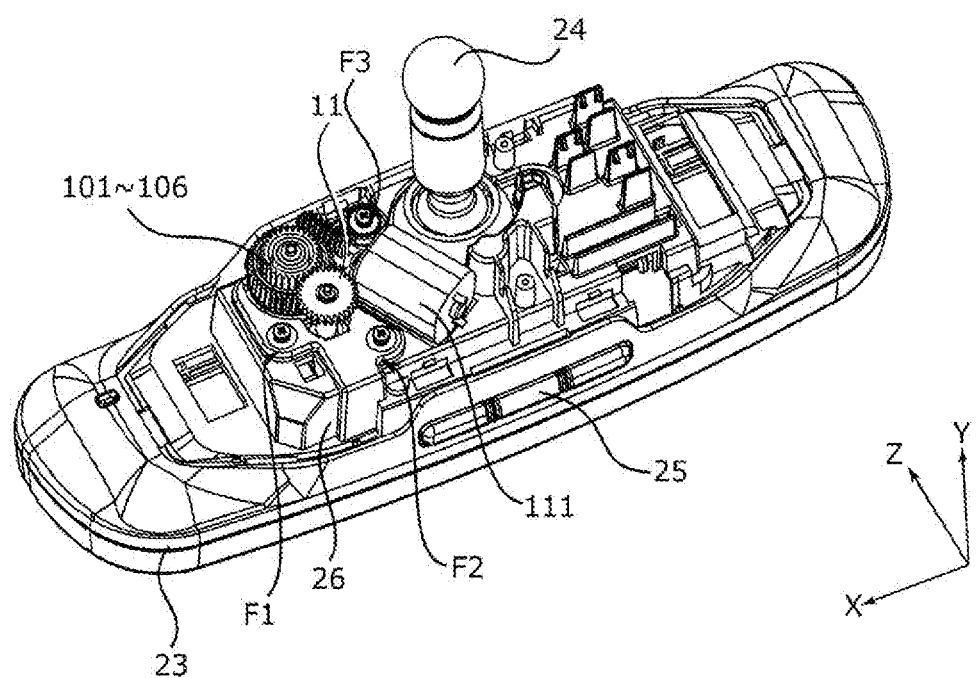
FIG. 4B is a rear perspective view showing the attachment mode of the motor unit in a state in which a motor bracket on a back side is further removed from FIG. 4A.

FIGS. 4A and 4B are views showing an example of an attachment mode of motor unit 11. FIG. 4A shows a state in which only a back portion of housing 23 is removed, and FIG. 4B shows a state in which motor bracket 112R in the back side is also removed.

Figure 7A:
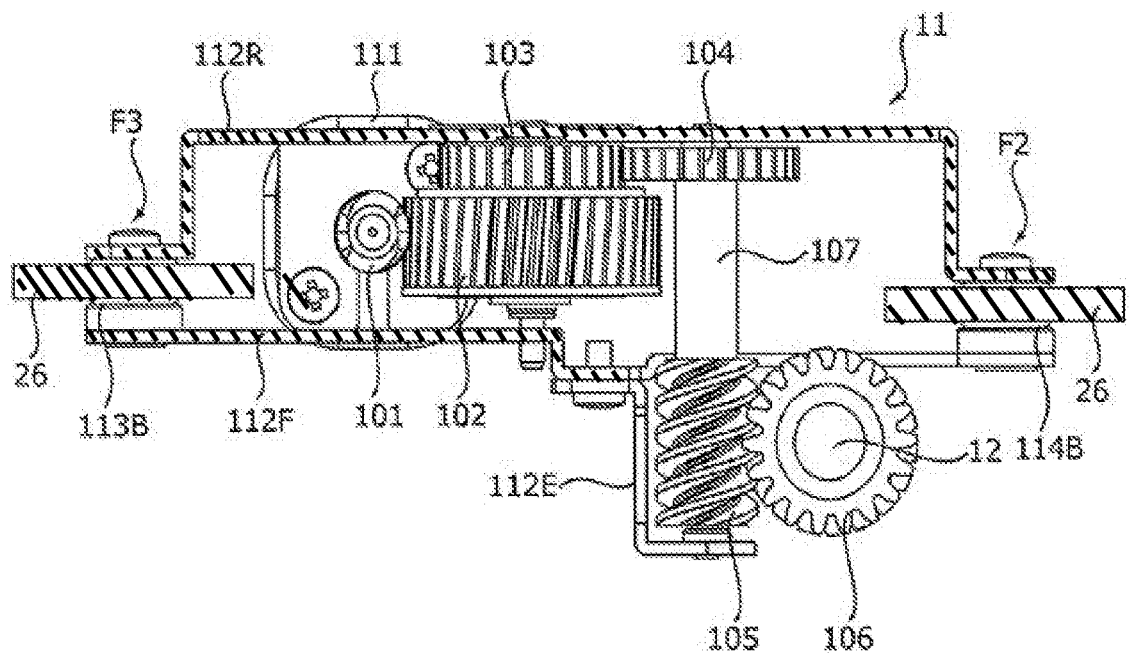
FIG. 7A is a developed view of the gear train of the motor unit shown in FIG. 6A.

As shown in FIGS. 4A and 4B, motor unit 11 is attached to inner case 26 as a part of housing 23. Specifically, as shown in FIG. 7A, motor 111 and a gear train including gears 101 to 106 are assembled to motor brackets 112F and 112R. In this state, motor brackets 112F and 112R sandwich a plate face of inner case 26. Furthermore, motor unit 11 is screwed to motor brackets 112F and 112R at three sections F1 to F3. In this way, motor unit 11 is fixed to inner case 26.

Figure 5A:
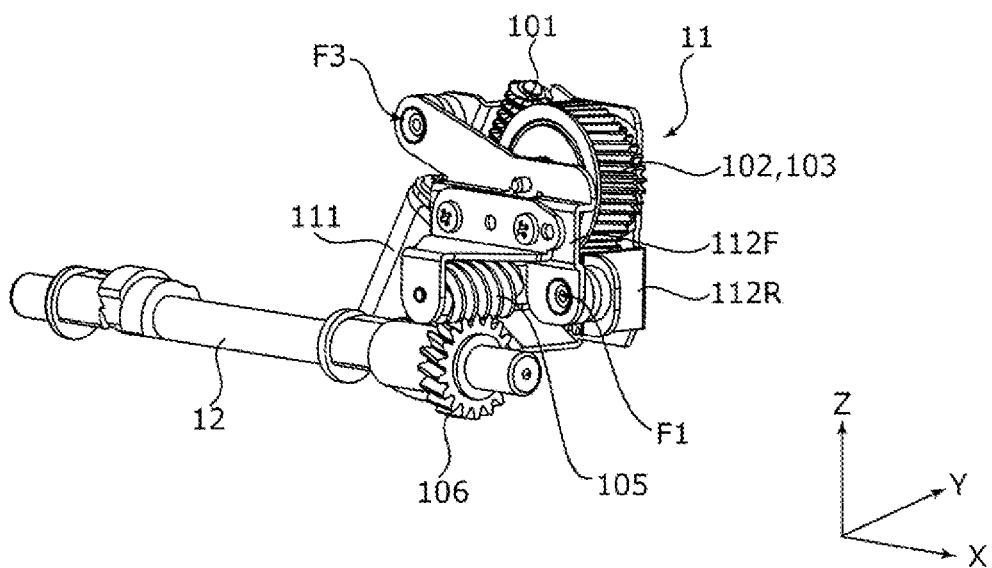
FIG. 5A is a perspective view showing a gear train of the motor unit in a state in which the motor bracket shown in FIG. 4B is attached.
Figure 5B:
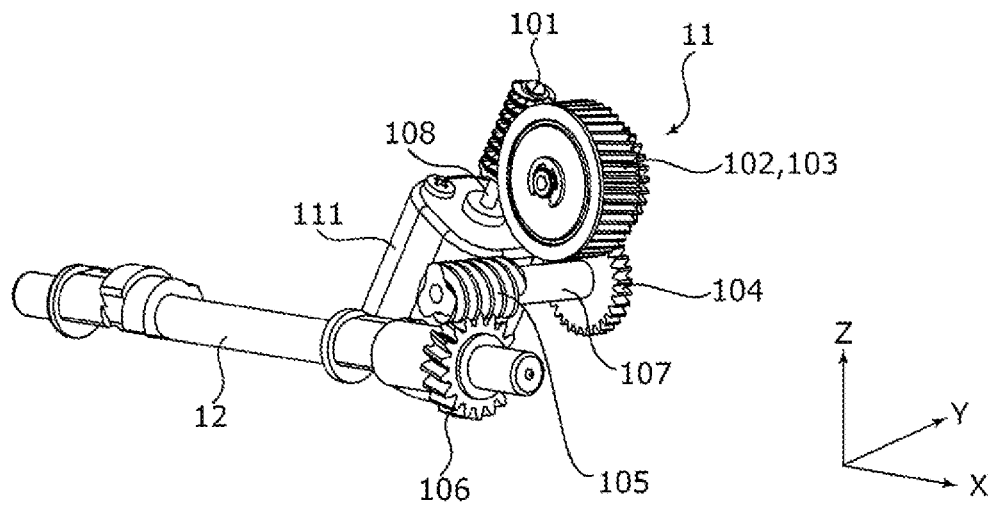
FIG. 5B is a perspective view showing the gear train of the motor unit in a state in which the motor bracket is removed from FIG. 5A.
Figure 6A:
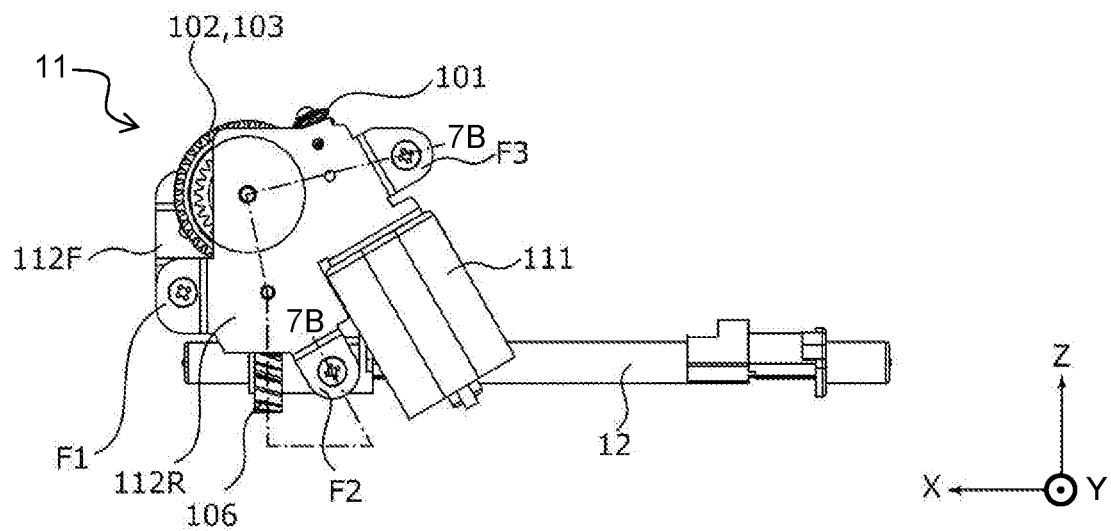
FIG. 6A is a rear view showing the gear train of the motor unit in a state in which the motor bracket is attached shown in FIG. 5A.
Figure 6B:
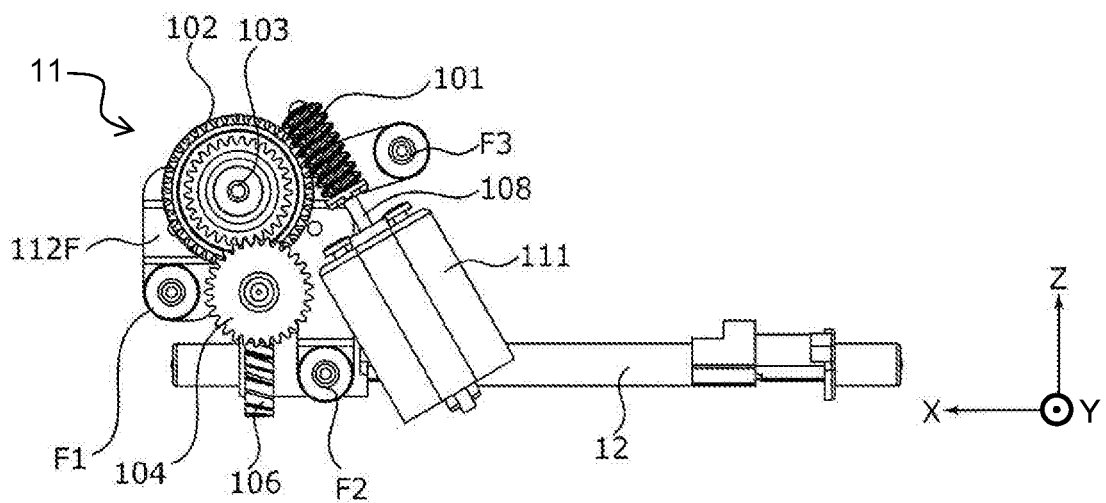
FIG. 6B is a rear view showing the gear train of the motor unit in a state in which the motor bracket is removed shown in FIG. 5B.
Figure 7B:
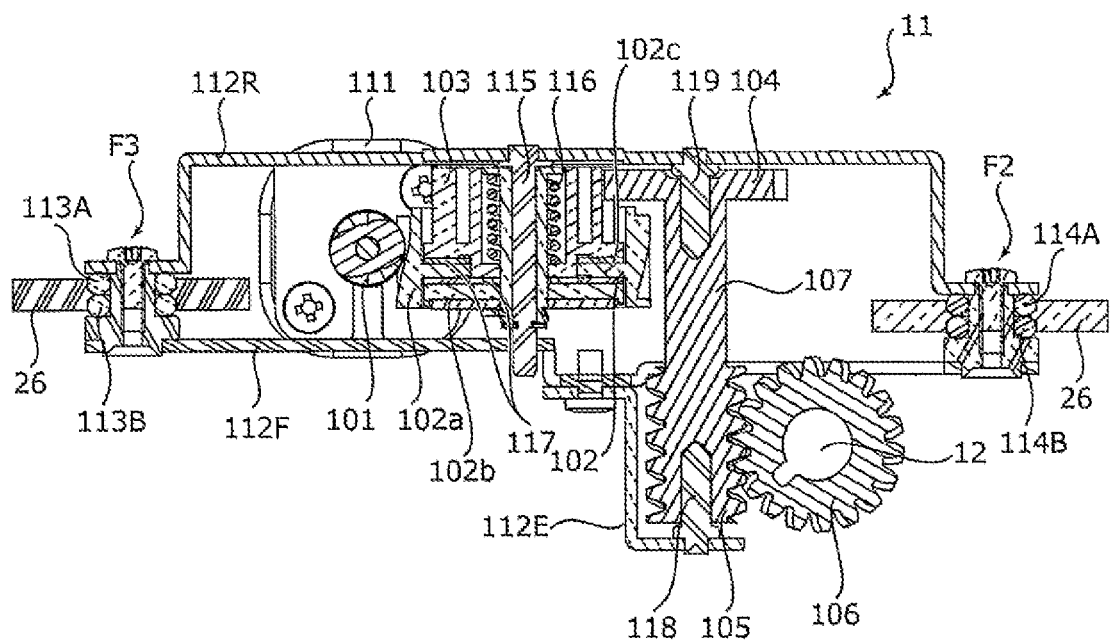
FIG. 7B is a sectional view taken along the cutting line 7B-7B of FIG. 6A.

FIGS. 5A and 5B are perspective views showing the gear train of motor unit 11. FIGS. 6A and 6B are rear views showing the gear train of motor unit 11. FIGS. 5A and 6A show a state in which motor brackets 112F and 112R are attached, and FIGS. 5B and 6B show a state in which motor brackets 112F and 112R are removed. FIG. 7B is a developed view of the gear train of motor unit 11 along the cutting line 7B-7B of FIG. 6A. FIG. 7A shows the sections only of motor bracket 112F and inner case 26 in FIG. 7B.

As shown in FIGS. 5A to 7B, motor unit 11 includes motor 111, motor brackets 112F and 112R, and the gear train including six gears 101 to 106, and the like.

As shown in FIG. 5B, gear 101 (a worm) is attached to motor shaft 108, and mesh with gear 102. Gears 102 and 103 rotate in conjunction with the rotation of gear 101. Gear 103 meshes with gear 104. Gear 104, shaft 107, and gear 105 (a cam worm) rotate in conjunction with the rotation of gear 103. Gear 105 meshes with gear 106 (the worm wheel). Thus, the driving force of motor 111 is transmitted to gears 102 and 103 via motor shaft 108 and gear 101, further transmitted to gear 104, shaft 107, and gear 105, and transmitted to last-stage gear 106. Thus, camshaft 12 to which gear 106 is disposed is rotated, and the inclination angle of the display surface is changed.

Each of gears 102 and 103 is a so-called clutch gear that blocks transmission of the driving force when a predetermined load is generated. Specifically, as shown in FIG. 7B, gear 102 includes gear main body 102a and lid 102b. Gear main body 102a includes annular sandwiched piece 102c on an inner peripheral surface. Compression coil spring 116 as a biasing member is inserted into gear fixing shaft 115 provided to stand on motor bracket 112R. In this state, gears 103 and 102 are sequentially attached, and fixed in a state biased by compression coil spring 116. At this time, felt members 117 are disposed between gear 103 and sandwiched piece 102c and between sandwiched piece 102c and lid 102b, respectively.

When a load is not generated in gear 103, gears 102 and 103 are connected to each other by a frictional force, and rotate together. On the other hand, when rotational operation of camshaft 12 is regulated, and a load is applied to gear 103, gear 103 cannot rotate and only gear 102 slides and rotates with respect to gear 103. In other words, motor 111 idles. This can prevent occurrence of an abnormal noise when a load is applied to motor 111.

More specifically, when the rotational operation of camshaft 12 is regulated, the gear train cannot rotate. Therefore, since a load is applied to motor 111 although for a short time, motor shaft 108 (see FIG. 5B) moves, and an abnormal noise may occur. Furthermore, when a load is applied to motor 111, since a load is also applied to housing 23 to which motor unit 11 shown in FIG. 4B is attached, distortion occurs in housing 23, and an abnormal noise may occur. In rearview mirror assembly 1, after the rotational operation of camshaft 12 shown in FIG. 5A is regulated and the gear train cannot rotate, motor 111 idles. Therefore, since a load is not applied to motor 111, occurrence of an abnormal noise can be prevented.

Gear 104, shaft 107 and gear 105 shown in FIG. 7B are supported from the both sides by gear fixing shafts 119 and 118. Gear fixing shafts 118 and 119 are provided to stand on motor brackets 112R and 112E, respectively. Gear fixing shafts 118 and 119 are disposed such that tip ends of gear fixing shafts 118 and 119 are in close contact with the bottoms of insertion holes opened in shaft 107, respectively. Thus, the central axis of shaft 107 is prevented from being displaced. Furthermore, by forming the shaft tip end and a bottom surface of the hole in a conical shape, a structure resistant to a load is achieved. Consequently, it is possible to prevent occurrence of an abnormal noise due to application of load to the gear train.

Motor bracket 112E is a shaft-fixing member for fixing a shaft of gear 105, and is attacked to motor bracket 112F. Motor bracket 112E is an elastic body such as a plate spring, and is disposed such that gear 105 is biased toward gear 106. Thus, gear 105 elastically meshes with gear 106.

Elastically meshing means a meshing method in which when a load is applied between gears, a load is relieved by the elasticity of at least one gear itself, or the elasticity of a member that fixes at least one gear. For example, when the gear train elastically meshes, even if a load is applied to the gear train by the rotational operation, the load is relieved by deformation of the elastic body. Therefore, the gear train can continue to rotate. Accordingly, in design, even if sufficient backlash is not provided, rotation of the gear train is not inhibited, and furthermore, occurrence of an impact noise due to the backlash can be suppressed.

In other words, in gears 105 and 106, when sufficient backlash is provided, a load is applied as the movement of the camshaft when the inclination angle of the display surface is changed, and backlash is in a biased state. When the drive of the motor stops and the load is released, meshing of the gears returns to the normal state. At this time, an impact noise occurs. In the rearview mirror assembly 1, since the backlash in gears 105 and 106 can be minimized, occurrence of such an impact noise can be prevented.

As mentioned above, motor unit 11 is screwed to motor brackets 112F and 112R. As shown in FIG. 7B, in fixed section F2 and F3, O-rings 113A and 114A, which are an elastic member, are interposed between motor bracket 112R and inner case 26. Furthermore, O-rings 113B and 114B are interposed between motor bracket 112F and inner case 26. The same is true to fixed section F1 shown in FIG. 6B. Note that sections where motor unit 11 is fixed to inner case 26 are not limited to three, and may be two, or four or more. Note that the elastic member is not limited to an O-ring. The elastic member may be a spring washer, a washer or a packing formed of an elastic material, or the like.

As each of O-rings 113A, 113B, 114A, and 114B functions as a damper, motor brackets 112R and 112F are brought into elastic contact with inner case 26. Consequently, even if a load is generated in the gear train, the load can be absorbed. That is to say, O-rings 113A, 113B, 114A, and 114B bias gear 105 to gear 106. In this way, O-rings 113A, 113B, 114A, and 114B, similar to motor bracket 112E, serve as elastically meshing gear 105 and gear 106 with each other. This also can prevent occurrence an impact noise caused by backlash. Furthermore, since motor unit 11 is not in direct contact with inner case 26, it is possible to prevent vibration of motor 111 from being transmitted to housing 23 and a driving sound from being amplified. Therefore, quietness is further improved.

As described above, rearview mirror assembly 1 (a vehicular rearview mirror device) in accordance with this exemplary embodiment includes housing 23, one-way mirror 21 (a mirror), camshaft 12, fixed part 13, and motor unit 11 (a drive part). One-way mirror 21 is disposed in the front side of housing 23. Camshaft 12 includes cam 121, and axially supported by housing 23. Fixed part 13 abuts on cam 121, and is axially supported by housing 23. Motor unit 11 provides camshaft 12 with a driving force for rotating camshaft 12.

As camshaft 12 is rotated by a driving force transmitted from motor unit 11, and camshaft 12 moves with respect to fixed part 13 by the action of cam 121, a movable part including housing 23, one-way mirror 21, and motor unit 11 as a whole tilts. Motor unit 11 includes motor 111 (a drive source) and a gear train that transmits the driving force of motor 111 to camshaft 12. The gear train includes gear 106 (a first gear) disposed to camshaft 12 and gear 105 (a second gear) that meshes with gear 106. Gear 105 elastically meshes with gear 106.

According to rearview mirror assembly 1, since backlash provided to the gear train can be minimized, it is possible to prevent the occurrence of an impact noise caused by the backlash at the time when an angle of the display surface is changed. Therefore, rearview mirror assembly 1 is extremely excellent in quietness.

Furthermore, rearview mirror assembly 1 in accordance with this exemplary embodiment further includes a stopper for regulating the tilting of the movable part. Motor unit 11 includes motor 111, and the gear train that transmits the driving force of motor 111 to camshaft 12. The gear train includes clutch gears (gears 105 and 106) that block the transmission of the driving force from motor 111 depending on a load generated in the movable part. Such a configuration may be employed.

This can prevent occurrence of an abnormal noise due to application of a load to motor 111 because motor 111 idles when the gear train cannot be rotated. Therefore, rearview mirror assembly 1 is extremely excellent in quietness.

As mentioned above, the disclosure has been specifically is described based on the exemplary embodiment, but the present disclosure is not limited to the above exemplary embodiment, and can be modified without departing from the gist of the present disclosure.

For example, the present disclosure can be applied not only to a rearview mirror assembly but also an antiglare rearview mirror.

A configuration of clutch gears included in the gear train is not limited to the exemplary embodiment, and they may have any configurations as long as transmission of the driving force from the drive source can be blocked depending on the load generated in the movable part.

In this exemplary embodiment, gears 105 and 106 are allowed to elastically mesh with each other by the effects of both motor bracket 112E and O-rings 113A, 113B, 114A, and 114B, but any one of them may be applied. When O-rings 113A, 113B, 114A, and 114B are provided, motor bracket 112E may be a hard member that is not an elastic body. When motor bracket 112E is an elastic body, O-rings 113A, 113B, 114A, and 114B may not be provided.

It should be construed that the exemplary embodiment disclosed above is illustrative in all aspects, and is not restrictive. The scope of the present disclosure is represented not by the above description but by the scope of the claims, and it is intended that all modifications within the sense and scope equivalent to the claims are involved in the scope of the present disclosure.

INDUSTRIAL APPLICABILITY

The present disclosure is suitable for a vehicular rearview mirror device in which an inclination angle of a display surface can be electrically adjusted.

REFERENCE MARKS IN THE DRAWINGS

1: rearview mirror assembly (rearview mirror device)
10: angle adjuster
11: drive part (motor unit)
101 to 106: gear
111: motor
112F, 112R, 112E: motor bracket
113A, 113B, 114A, 114B: O-ring
115, 118, 119: gear fixing shaft
116: compression coil spring
117: felt member
12: camshaft
121: cam
12$b$, 12$c$: engaging part (stopper)
13: fixed part
13$b$, 13$c$: engaging piece (stopper)
21: one-way mirror
22: liquid crystal display (display device)
23: housing

The invention claimed is:

1. A vehicular rearview mirror device comprising:
a housing having an opening portion;
a mirror covering the opening portion of the housing;
a camshaft having a cam and axially supported by the housing;
a fixed part abutting on the cam and axially supported by the housing;
a drive part that provides the camshaft with a driving force for rotating the camshaft; and
a plate spring, wherein:
the housing, the mirror, and the drive part constitute a movable part,
the camshaft is rotated by the driving force transmitted from the drive part and is moved with respect to the fixed part by an action of the cam so as to allow the movable part as a whole to be tilted,
the drive part includes a drive source and a gear train that transmits the driving force of the drive source to the camshaft,
the gear train includes a first gear provided on the camshaft, and a second gear that elastically meshes with the first gear, and
the plate spring is directly attached to and fixes a shaft of the second gear, and presses the second gear against the first gear.

2. The vehicular rearview mirror device according to claim 1, further comprising:
a bracket that supports the shaft and accommodates the drive part, the bracket being attached to the housing; and
an elastic member interposed between the housing and the bracket.

3. The vehicular rearview mirror device according to claim 1, further comprising:
a bracket that supports the shaft and accommodates the drive part, the bracket being attached to the housing; and
an elastic member interposed between the housing and the bracket.

4. The vehicular rearview mirror device according to claim 3, wherein the bracket is screwed to the housing, and the elastic member is an O-ring.

5. The vehicular rearview mirror device according to claim 1,
wherein the mirror is a one-way mirror having an outer surface and a back surface that is a reverse side of the mirror from the outer surface,
the vehicular rearview mirror device further comprises a display device that faces the back surface of the one-way mirror and displays an image to be captured by a vehicle-mounted camera.

6. The vehicular rearview mirror device according to claim 1, further comprising a stopper that regulates tilting of the movable part,
wherein the gear train further includes a clutch gear that blocks transmission of the driving force from the drive source depending on a load generated in the movable part.

7. The vehicular rearview mirror device according to claim 6,
wherein the stopper includes an engaging part provided to the camshaft, and an engaging piece provided to the fixed part, and
when the camshaft is rotated, the engaging part is allowed to abut on the engaging piece so that rotational movement of the camshaft is regulated.

8. The vehicular rearview mirror device according to claim 6, wherein the drive source is driven and idles even when the stopper regulates the tilting of the movable part.

9. The vehicular rearview mirror device according to claim 2, wherein the bracket is screwed to the housing, and the elastic member is an O-ring.

* * * * *